UNITED STATES PATENT OFFICE.

MONE R. ISAACS, OF PHILADELPHIA, PENNSYLVANIA.

ADHESIVE COMPOUND, GLUE, &c.

No. 845,791.   Specification of Letters Patent.   Patented March 5, 1907.

Application filed October 24, 1906. Serial No. 340,275.

*To all whom it may concern:*

Be it known that I, MONE R. ISAACS, a citizen of the United States, and a resident of the city of Philadelphia, State of Pennsylvania, have invented certain new and useful Improvements in Adhesive Compounds, Glues, Sizings, and the Like, of which the following is a full, clear, and complete disclosure.

My invention relates to adhesive compounds, glues, and sizings made from proteids, dextrin, or similar substance; and the objects of my invention are to regulate the set or hardening qualities thereof and to enrich, preserve, and improve the same and to render the resulting compound adaptable to a greater variety of uses in the arts than has heretofore been accomplished.

In carrying out my invention I combine with casein or any other suitable proteid, whether animal or of vegetable origin, suitable proportions of a solvent, a silicate, and fluorid. It is of course to be understood that when used either as a glue or as a sizing these ingredients are dissolved in a suitable quantity of water and reduced to the form of a liquid or semiliquid composition.

I have found that any of the following solvents are suitable for my purposes—viz., potassium borate, borax, trisodium phosphate, tripotassium phosphate, sodium carbonate, potassium carbonate, and sodium hydroxid.

The addition of a silicate to an adhesive compound, glue, or sizings made from casein or other suitable proteid renders the same more or less waterproof and adds strength to the same. Any of the alkaline silicates—such as sodium silicate, potassium silicate, or ammonium silicate—are excellently adapted for the purpose.

The time within which the adhesive compound, glue, or sizing or similar substance made from casein will harden or set may be regulated by the addition of a suitable fluorid, the greater proportion of fluorid added acting to increase the time required for the compound to set, in addition increasing the flowing qualities of the same. The fluorid of sodium, potassium, or ammonium may be advantageously employed as one of the ingredients of my improved adhesive compound, glue, or sizing.

I have found that the preparations of ingredients as stated below will give excellent results: casein, one hundred parts; a solvent for casein, five to fifteen parts; sodium fluorid, two to ten parts; sodium silicate, two to fifteen parts.

It sometimes occurs that it is only desirable to package suitable proportions of some of the above ingredients, leaving it to the user to supply the remaining ingredients and water—that is to say, by way of example, the user may produce his own casein and merely desire the other material for the production of my improved compound, glue, or sizing, in which event the solvent, fluorid, and silicate would be packaged together as a composition to be used as an ingredient for adhesive compounds. So any or all of the above ingredients may be mixed and packaged for use with the other substances.

While I have described the several ingredients and the manner of combining the same, I do not desire to be limited to the particular preparations and amounts of the same as above stated, since a composition of matter containing the above or similar ingredients in any proportions or quantities is fully within the scope and objects of my invention. Thus for some compounds the alkaline silicate and alkaline fluorid may be sufficiently alkaline to dispense with any additional alkali to act as a solvent. It is to be further noted that when I employ the word "proteid" I use it to include all substances which act, when incorporated with the other ingredients, in a manner similar to proteid—e. g., gluten, albumen, casein, glue, starch, dextrin, or similar gums and substances, whether of vegetable or of animal origin.

Having thus described my invention, what I claim, and desire to protect by Letters Patent of the United States, is—

1. A composition of matter, consisting of a proteid, a solvent therefor, a silicate and a fluorid.

2. A composition of matter, consisting of a proteid, an alkaline solvent therefor, a silicate and a fluorid.

3. A composition of matter, consisting of a proteid, a solvent therefor, an alkaline silicate and a fluorid.

4. A composition of matter, consisting of a proteid, a solvent therefor, a silicate and an alkaline fluorid.

5. A composition of matter, consisting of a proteid, a solvent therefor, an alkaline silicate and an alkaline fluorid.

6. A composition of matter, consisting of a proteid, an alkaline solvent therefor, an alkaline silicate, and an alkaline fluorid.

7. An adhesive compound, glue or sizing, consisting of a proteid, an alkaline solvent therefor, sodium silicate and sodium fluorid.

8. An adhesive compound, glue or sizing, consisting of casein, a solvent therefor, a silicate and a fluorid.

9. An adhesive compound, glue or sizing, consisting of casein, an alkaline solvent therefor, a silicate and a fluorid.

10. An adhesive compound, glue or sizing, consisting of a casein, an alkaline solvent therefor, an alkaline silicate and an alkaline fluorid.

11. An adhesive compound, glue or sizing, consisting of casein, an alkaline solvent therefor, sodium silicate and a sodium fluorid.

12. An adhesive compound, glue or sizing, consisting of casein one hundred parts, an alkaline solvent therefor five to fifteen parts, sodium silicate two to fifteen parts and sodium fluorid two to ten parts.

13. An adhesive compound, glue or sizing, consisting of a proteid, an alkaline silicate and an alkaline fluorid.

14. An adhesive compound, glue or sizing, consisting of a proteid, sodium silicate and sodium fluorid.

15. An adhesive compound, glue or sizing, consisting of casein, an alkaline silicate and an alkaline fluorid.

16. An adhesive compound, glue or sizing, consisting of casein, sodium silicate and a fluorid.

17. An adhesive compound, glue or sizing, consisting of casein, a silicate and sodium fluorid.

18. An adhesive compound, glue or sizing, consisting of casein, sodium silicate and sodium fluorid.

19. A composition of matter consisting of casein one hundred parts, a solvent for the casein five to fifteen parts, sodium fluorid two to ten parts, and sodium silicate two to fifteen parts.

20. An adhesive compound, glue or sizing, consisting of proteid, alkaline silicate, sodium fluorid and water.

21. An adhesive compound of glue or sizing, consisting of casein, a silicate, sodium fluorid and water.

22. An adhesive compound of glue or sizing consisting of casein, sodium silicate, sodium fluorid and water.

In witness whereof I have hereunto set my hand this 20th day of October, A. D. 1906.

MONE R. ISAACS.

Witnesses:
ALSTON B. MOULTON,
ALEXANDER PARK.